United States Patent [19]

Chatterjee

[11] Patent Number: 5,922,471
[45] Date of Patent: *Jul. 13, 1999

[54] METALLIZABLE POLYPROPYLENE RANDOM COPOLYMER COMPOSITIONS

[75] Inventor: Ananda M. Chatterjee, Katy, Tex.

[73] Assignee: Union Carbide Chemicals & Plastics Technology Corporation, Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,661

[22] Filed: Mar. 4, 1996

[51] Int. Cl.$^6$ .................................................. B32B 15/08
[52] U.S. Cl. .................. 428/461; 428/457; 428/523; 524/126; 524/135; 524/543; 524/570; 524/579
[58] Field of Search ..................... 428/457, 461, 428/523; 526/125, 348.6; 524/102, 543, 126, 570, 135, 579

[56] References Cited

U.S. PATENT DOCUMENTS

| | | | |
|---|---|---|---|
| 4,168,361 | 9/1979 | Oda et al. | 526/348.6 |
| 4,343,852 | 8/1982 | Isaka et al. | 428/216 |
| 4,379,759 | 4/1983 | Goeke et al. | 252/429 B |
| 4,384,024 | 5/1983 | Mitchell et al. | 428/349 |
| 4,487,871 | 12/1984 | Ishibashi et al. | 524/100 |
| 4,508,786 | 4/1985 | Ishibashi et al. | 428/461 |
| 4,604,322 | 8/1986 | Reid | 428/332 |
| 4,728,705 | 3/1988 | Nestlerode et al. | 526/125 |
| 5,049,436 | 9/1991 | Morgan et al. | 428/213 |
| 5,281,483 | 1/1994 | Hwo | 428/461 |
| 5,331,054 | 7/1994 | Fujita et al. | 525/240 |
| 5,484,633 | 1/1996 | Murschall et al. | 428/35.7 |

FOREIGN PATENT DOCUMENTS

| | | |
|---|---|---|
| 361280 | 4/1990 | European Pat. Off. . |
| 55-52333 | of 1980 | Japan . |
| 9502638 | 1/1995 | WIPO . |
| 9514738 | 6/1995 | WIPO . |

*Primary Examiner*—Paul Thibodeau
*Assistant Examiner*—D Lawrence Tarazano

[57] ABSTRACT

Polypropylene random copolymer resins and metallized, heat sealable cast films produced from such resins include (1) a polypropylene-α-olefin random copolymer such as a propylene-butene-1 or propylene-ethylene random copolymer and (2) an additive package including a synthetic amorphous silica, a hindered phenolic antioxidant, a processing stabilizer and an acid acceptor. The compositions according to the invention are useful for the preparation of metallized, heat sealable packaging films suitable for protecting goods, particularly goods requiring a long shelf life such as foods or semiconductor products.

12 Claims, No Drawings

METALLIZABLE POLYPROPYLENE RANDOM COPOLYMER COMPOSITIONS

FIELD OF THE INVENTION

The invention relates generally to metallizable polyolefin random copolymer compositions. More particularly, the invention relates to polypropylene random copolymer resins and metallized, heat sealable cast films produced from such resins. In a preferred embodiment, the inventive compositions comprise (1) a polypropylene-α-olefin random copolymer such as a propylene-butene-1 or a propylene-ethylene random copolymer and (2) an additive package including a synthetic amorphous silica, a hindered phenolic antioxidant, a processing stabilizer and an acid acceptor. The resin compositions according to the invention are useful for the preparation of metallized, heat sealable packaging films suitable for protecting goods, particularly goods having a long shelf life such as foods or semiconductor products.

BACKGROUND OF THE INVENTION

Metallized films have been used as a packaging material, for example, in the form of a layered polypropylene film/aluminum foil structure. However, many such conventional films have a weak adhesive force between the base film and the metallic layer as well as poor printability and adhesive properties. Japanese Patent Application No. 55-52333/1980 discloses that a cause of these difficulties is the migration or transfer of additives in the base polypropylene film, such as acid neutralizers, slip agents, antioxidants or other additives, to the metallized surface to deteriorate the properties of the metallized film.

U.S. Pat. Nos. 4,508,786 and 4,487,871 to Ishibashi et al. disclose that low molecular weight antioxidants and fatty acid derivatives such as higher fatty acid salts, fatty amides, fatty esters and fatty amine derivatives have a particularly negative effect on the film characteristics. The Ishibashi et al. patents further disclose a polyolefin resin of blended propylene-α-olefin crystalline copolymer and high density polyethylene (HDPE) containing a phenolic antioxidant and/or phosphonite antioxidant additive and an inorganic filler for making metallized films.

However, there is a need in the art for more economical resins for producing metallized films having good adhesion and heat sealability and which provide a long shelf life.

SUMMARY OF THE INVENTION

The invention relates generally to metallizable polyolefin random copolymer compositions. More particularly, the invention relates to polypropylene random copolymer resins and metallized, heat sealable cast films produced from such resins. In a preferred embodiment, the inventive compositions comprise (1) a polypropylene-α-olefin random copolymer such as a propylene-butene-1 or propylene-ethylene random copolymer and (2) an additive package including a synthetic amorphous silica, a hindered phenolic antioxidant, a processing stabilizer and an acid acceptor. The compositions according to the invention are useful for the preparation of metallized, heat sealable packaging films suitable for protecting goods, particularly goods requiring a long shelf fife such as foods or semiconductor products.

DETAILED DESCRIPTION OF THE PREFERRED EMBODIMENTS

The base polymer employed in the compositions according to the invention is a polypropylene-α-olefin random copolymer, preferably a propylene-ethylene copolymer or a propylene-butene-1 random copolymer. These base polymers can be prepared by conventional polymerization processes. For example, the base polymer may be prepared by polymerizing propylene and an α-olefin having 5 to 8 carbon atoms under polymerization conditions in the presence of a titanium-based, olefin polymerization catalyst system, such as a magnesium halide-supported titanium-containing polymerization catalyst system. Such polymerization catalysts are described in numerous references including Nestlerode, U.S. Pat. No. 4,728,705, the disclosure of which is incorporated herein by reference. Conventional polymerization processes are also extensively published including, for example, the fluidized bed, gas phase reaction described by Goeke et al., U.S. Pat. No. 4,379,759, the disclosure of which is incorporated herein by reference. The polymerization processes may also include the addition of hydrogen to the reaction mixture to control the molecular weight. A post-polymerization visbreaking step can be included to increase the melt flow of the polymer product as desired.

The polymers produced according to this invention are random copolymers which are predominantly isotactic in structure. In a preferred embodiment, the random copolymer is a propylene-butene-1 copolymer, wherein the random copolymer comprises from about 0.8% to about 20% by weight of butene-1. It is preferred that the random copolymer comprises 5% to 18% by weight of butene-1, with 7% to 17% by weight of butene-1 being more preferred, and 10% to 15% by weight of butene-1 being most preferred.

In another preferred embodiment, the random copolymer is a propylene-ethylene copolymer, wherein the random copolymer comprises from about 0.5% to about 7% by weight of ethylene. It is preferred that the random copolymer comprises 1% to 6% by weight of ethylene, with 2% to 5% of ethylene being more preferred, and 3% to 3.5% by weight of ethylene being most preferred.

The synthetic amorphous silica agent to be employed in the inventive compositions acts as an antiblock agent to prevent blocking or clinging of sheets of film to each other. Suitable synthetic amorphous silica additives include GASIL® AB720, which is available from Crosfield Group of Warrington, England, or SYLOBLOC® 48, which is available from W. R. Grace Company. GASIL® AB720 has a platy morphology, a relatively high bulk density in the rage from 300 to 360 gm/liter, and a low oil absorption in the range from 80 to 100 gm/100 gm. SYLOBLOC® 48 has a spheroidal particle morphology and typically has a bulk density of 128 gm/liter and an oil absorption of 220 gm/100 gm. The synthetic amorphous silica agent is used in an amount ranging from 0.05% to 0.4% by weight of the copolymer composition, preferably 0.07% to 0.25% by weight, 0.10 to 0.20% being more preferred, with 0.13 to 0.17% being most preferred.

Examples of hindered phenolic antioxidants suitable for the present invention include pentaerythrityl tetrakis-3(3,5-di-tert-butyl4-hydroxyphenyl)propionate (for example, IRGANOX® 1010 available from Ciba-Geigy); tris[3,5-di-t-butyl-4-hydroxybenzyl) isocyanurate (for example, IRGANOX® 3114 available from Ciba-Geigy); octadecyl 3-(3', 5'-di-tert-butyl-4'-hydroxyphenyl)proprionate (for example, IRGANOX® 1076 available from Ciba-Geigy); and 1,3,5-trimethyl 2,4,6-tris(3,5-di-tert-butyl-4-hydroxybenzyl) benzene (for example, ETHANOX® 330 available from Albemarle). In a preferred embodiment, the hindered phenolic antioxidant in the inventive composition is IRGANOX® 1010. Hindered phenolic antioxidants prevent thermal oxidative degradation of the polymer by scavenging free radicals. The antioxidant is used in an amount ranging from 0.03 to 0.08% weight of the copolymer composition, preferably 0.05–0.06% weight, with 0.04% weight being most preferred.

Examples of processing stabilizers which can be used in the inventive compositions are bis(2,4-di-tert-butylphenyl) pentaerythritoldiphosphite, tetrakis[2,4-di-tert-butylphenyl] 4-4'-biphenylylene diphosphonite, and tris(2,4-di-tert-butylphenyl)phosphite. Processing stabilizers, also referred to as secondary antioxidants, prevent the degradation of the polymer during melt processing, for example, during extrusion of film. In a preferred embodiment, the process stabilizer used in the inventive compositions is SANDOSTAB® P-EPQ, which is available from Clariant. The processing stabilizer is preferably used in an amount of 0.2 to 0.04% by weight of the copolymer composition, with 0.04% weight being most preferred.

Examples of acid acceptors which can be used in the invention are hydrotalcite DHT-4A, calcium stearate and calcium lactate. In a preferred embodiment, the acid acceptor used in the inventive compositions is DHT-4A, preferably in an amount of 0.02 to 0.04% by weight of the composition. Acid acceptors act to neutralize acidic species, such as hydrochloric acid (HCl), which are residues from the polymerization catalyst system such as the Ziegler-Natta type catalyst system. By this neutralization, corrosion of processing equipment is prevented. The acid acceptor can also prevent the reaction of HCl with the hindered phenolic antioxidant.

The random copolymer compositions according to the invention optionally incorporate other additives such as one or more ultraviolet stabilizers, acid neutralizing agents, slip agents, or combinations thereof. For example, typical ultraviolet stabilizers include 2-hydroxy-4-n-octoxy-benzophenone, 2-(2-hydroxy-3,5-di-butyl-phenyl)-5-chlorobenzotriazole, poly[[6-[(1,1,3,3-tetramethyl butyl) amino]s-triazine-2,4-diyl] [[(2,2,6,6-tetramethyl-4-piperidyl)imino] hexamethylene [(2,2,6,6-tetramethyl-4-piperidyl)imino]], and dimethyl succinate-2-(4-hydroxy-2,2,6,6-tetramethyl-1-piperidyl)ethanol condensate.

The compositions of the invention can be processed by conventional procedures used for thermoplastic materials such as extrusion, injection molding, thermoforming and related processes. Among particular applications for the compositions are the production of oriented or unoriented films by casting or film blowing methods. After fabrication, the film can be heat sealed by sealing jaws at a preset temperature, pressure and dwell time. The resulting film preferably has lower heat seal initiation temperatures, low hexane extractables and improved optical properties such as high transparency, high gloss and low yellowness index.

Films produced from the inventive resin compositions may be metallized by conventional metallization processes such as vacuum deposition of aluminum. In a preferred embodiment, the metallized films according to the invention have a water vapor transmission rate (WVTR) below 0.05 gm/100 sq. inch/24 hr. at 90% relative humidity and 100° F., and more preferably in the range of 0.01 to 0.05 gm/100 sq. inch/24 hr. at 90% relative humidity and 100° F.

Other features, advantages and embodiments of the invention disclosed herein will be readily apparent to those exercising ordinary skill after reading the foregoing disclosure. In this regard, while specific embodiments of the invention have been described in detail, variations and modifications of these embodiments can be effected without departing from the spirit and scope of the invention as described and claimed.

EXAMPLES

The following formulations were compounded and tested:

TABLE I

| Ingredients (wt %) | EX. 1˙ | EX. 2˙ | EX. 3 | EX. 4 | EX. 5 |
|---|---|---|---|---|---|
| IRGANOX ® 1010 | 0.04 | 0.04 | 0.04 | 0.042 | 0.04 |
| SANDOSTAB ® P-EPQ | 0.04 | 0.04 | 0.04 | 0.04 | 9.04 |
| DHT-4A | 0.02 | 0.02 | 0.02 | 0.02 | 0.02 |
| SYLOBLOC ® 48 | — | — | 0.05 | 0.1 | 0.2 |
| HDPE* | — | 6.0 | — | — | — |
| $C_3/C_2$ random copolymer powder with 3.2% w $C_2$** | 99.9 | 93.9 | 99.85 | 99.8 | 99.7 |

˙Comparative Example

*Unstabilized granular HDPE resin having melt index 6.5 (Cond. E) and density 0.952 gm/cc.
**Unstabilized powder having 10 MF (Cond. L).

TABLE 11

| Ingredients (wt %) | EX. 6˙ | EX. 7 | EX. 8˙ | EX. 9˙ | EX. 10 | EX. 11˙ |
|---|---|---|---|---|---|---|
| IRGANOX ® 1010 | 0.04 | 0.04 | 0.04 | 0.04 | 0.04 | 0.04 |
| SANDOSTAB ® P-EPQ | 0.04 | 0.04 | 0.04 | 0.04 | 0.04 | 0.04 |
| DHT-4A | 0.02 | 0.02 | 0.02 | 0.02 | 0.02 | 0.02 |
| SYLOBLOC ® 48 | — | 0.1 | — | — | 0.1 | — |
| HDPE* | — | — | 6.0 | — | — | 6.0 |
| $C_3/C_2$ random copolymer powder with 3.7% w $C_2$** | 99.9 | 99.8 | 95.9 | — | — | — |
| $C_3/C_4$ random copolymer powder with 12.7% w $C_4$*** | — | — | — | 99.9 | 99.8 | 93.9 |

˙Comparative Example
*Unstabilized granular HDPE resin of melt index 6.5 and a density 0.952 gm/cc.
**Unstabilized powder having 3.4 MF.
***Unstabilized powder having 4.4 MF.

All formulations were compounded into pellets using a 1¼ inch Brabender extruder at 220° C. melt temperature under nitrogen, 100 RPM screw speed. The pellets were extruded into 1 mil thick cast film using a ¾ inch Brabender extruder at 220° C. melt temperature, 35 RPM screw speed, 8-inch wide slot die and Killion chill roll (15° C.).

In testing the film properties, seal strength was measured by ASTM D-1876, after heat sealing 1-inch strips of cast film in a Sentinel heat sealer at 110° C. and 120° C.; coefficient of friction (COF) was measured by ASTM D-1894; haze by ASTM D-1003; clarity by D-1746; gloss by ASTM D-523; tensile property by ASTM D-882; tear strength by ASTM D-1922; and Dart drop impact strength by ASTM D-3029.

TABLE III

| Example | Seal Strength (g) 110° C. | Seal Strength (g) 120° C. | COF (Static) | COF (Kinetic) | Haze (%) | Clarity (%) | Gloss (60°) |
|---|---|---|---|---|---|---|---|
| 1* | 124.1 | 280.7 | 0.394 | 0.376 | 0.3 | 49.1 | 112.4 |
| 2* | 27.5 | 304.9 | 0.324 | 0.314 | 2.0 | 26.4 | 127.8 |
| 3 | 45.2 | 144.7 | 0.372 | 0.363 | 0.5 | 41.2 | 141.0 |
| 4 | 143.4 | 383.5 | 0.393 | 0.382 | 1.0 | 42.0 | 134.6 |
| 5 | 137.4 | 304.6 | 0.365 | 0.343 | 1.8 | 30.2 | 128.8 |
| 6* | 160.5 | 571.7 | 0.447 | 0.401 | — | 66.0 | 137.7 |
| 7 | 109.5 | 418.8 | 0.344 | 0.360 | 1.0 | 50.4 | 136.8 |
| 8* | 31.7 | 237.8 | 0.440 | 0.389 | 1.0 | 44.5 | 123.9 |
| 9* | 349.1 | 1143 | 0.453 | 0.443 | 0.1 | 63.8 | 125.6 |
| 10 | 358.2 | 1534 | 0.396 | 0.364 | 0.9 | 43.6 | 138.5 |
| 11* | 192.7 | 1312 | 0.405 | 0.394 | 1.5 | 48.8 | 140.4 |

*Comparative Examples

The compositions according to the invention (Examples 3–5, 7 and 10) show higher heat seal strength, lower coefficient of friction (except in 3.2% w C$_2$ random copolymer) and better optical properties like haze, clarity and gloss than the Comparative Examples (Examples 1, 2, 6, 8, 9 and 11).

TABLE IV

| {PRIVATE} | Tear Strength (gm/mil) | | Tensile Properties | | | | Dart Drop Impact Strength |
| | | | Modulus 1% secant (psi) | | Elong. at brk (%) | | |
| Example | MD | TD | MD | TD | MD | TD | (in-gm) |
|---|---|---|---|---|---|---|---|
| 1 | 36.4 | 53.1 | 106,200 | 108,400 | 862.1 | 814.8 | 4316 |
| 2 | 8.3 | 17.8 | 158,900 | 153,400 | 773.7 | 561.7 | <520 |
| 4 | 37.8 | 54.2 | 112,400 | 111,700 | 737.2 | 603.6 | 2496 |

Table IV compares comparative Examples 1 and 2 and inventive Example 4. Compared to Example 2, which contains HDPE and no silica antiblock agent, the inventive composition Example 4 shows higher tear strength and higher Dart drop impact strength of film.

An ABA coextruded cast film was made, where A was the coating layer made from resin formulation of Example 3 and B (core layer) was homopolymer polypropylene. The film was metallized by vacuum deposition of aluminum, for example, using a line speed of 775 ft/min, a vacuum of $3 \times 10^{-4}$ torr at the end of the metallization run, a takeup tension of 22 lb, a payoff tension of 31 lb, a chill roll temperature of −28° C., and a time of 19 minutes to metallize the roll of film. The water vapor transmission rate (WVTR) indicates the permeability of water vapor through the metallized film and relates to the shelf life of goods stored in a package made from the metallized film. WVTR was measured by ASTM F-1249-90. The WVTR was excellent, namely 0.02 gm/100 sq. inch/24 hr. at 90% relative humidity and 100° F., thereby indicating that a product stored in a package made of such a metallized film would have a superior shelf life.

What is claimed is:

1. A composition useful in the preparation of metallizable films said composition consisting essentially of:
    (a) a propylene-α-olefin random copolymer;
    silica in an amount of about 0.05 to about 0.4% by weight of the composition;
    (c) a hindered phenolic antioxidant in an amount of about 0.03 to about 0.08% by weight of the composition;
    (d) a processing stabilizer in an amount of about 0.02 to about 0.04% by weight of the composition; and
    (e) an acid acceptor in an amount of about 0.02 to about 0.04% by weight of the composition.

2. A composition as defined in claim 1 wherein said copolymer is a propylene-butene-1 copolymer.

3. A composition as defined in claim 1 wherein said copolymer comprises up to 20% by weight butene 1.

4. A composition as defined in claim 1 wherein said copolymer is a propylene-ethylene copolymer.

5. A composition as defined in claim 1 wherein said copolymer comprises up to 7% by weight ethylene.

6. A metallized film comprising:
    i) at least one layer of a polypropylene composition consisting essentially of:
        (a) a propylene-α-olefin random copolymer;
        (b) a synthetic amorphous silica in an amount of about 0.05 to about 0.4% by weight of the composition;
        (c) a hindered phenolic antioxidant in an amount of about 0.03 to about 0.08% by weight of the composition;
        (d) a process stabilizer in an amount of about 0.02 to about 0.04% by weight of the composition;
        (e) an acid acceptor in an amount of about 0.02 to about 0.04% by weight of the film, and
    ii) a layer of metal deposited on the layer of polypropylene compositiion.

7. A metallized film as defined in claim 6 wherein the water vapor transmission rate (WVTR) is less than 0.05 gm/100 sq. inch/24 hr. at 90% relative humidity and 100° F.

8. A metallized film as defined in claim 6 wherein said copolymer is a propylene-butene-1 copolymer.

9. A metallized film as defined in claim 8 wherein said copolymer comprises up to 20% by weight butene 1 .

10. A metallized film as defined in claim 6 wherein said copolymer is a propylene-ethylene copolymer.

11. A metallized film as defined in claim 10 wherein said copolymer comprises up to 7% by weight ethylene.

12. A metallized film as defined in claim 6 wherein said metal is aluminum.

* * * * *

UNITED STATES PATENT AND TRADEMARK OFFICE
CERTIFICATE OF CORRECTION

PATENT NO. : 5,922,471
DATED : July 13, 1999
INVENTOR(S) : Ananda M. Chatterjee

It is certified that error appears in the above-indentified patent and that said Letters Patent is hereby corrected as shown below:

Column 6, line 9, before "silica" insert -- (b) --.

Signed and Sealed this

Ninth Day of November, 1999

Attest:

Q. TODD DICKINSON

*Attesting Officer*  *Acting Commissioner of Patents and Trademarks*